(No Model.)
J. RENSON.
MILK BOILING VESSEL.
No. 258,475. Patented May 23, 1882.
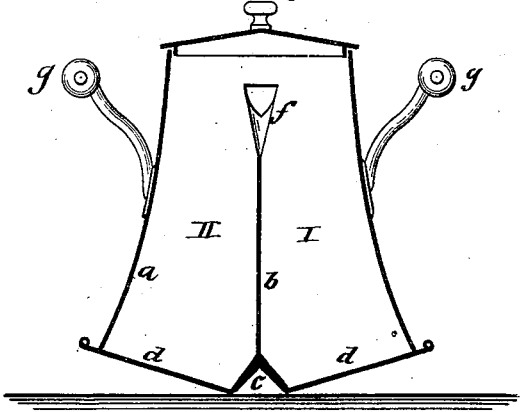
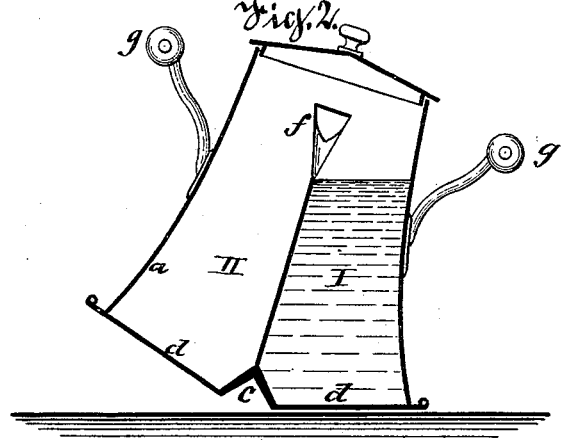
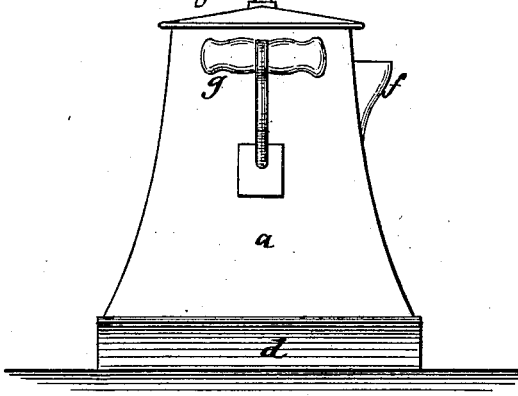
WITNESSES:
Jol. K. Rosenbaum.
Otto Risch.
INVENTOR
Jean Renson
BY Paul Goepel.
ATTORNEY

United States Patent Office.

JEAN RENSON, OF DUISBURG, PRUSSIA, GERMANY.

MILK-BOILING VESSEL.

SPECIFICATION forming part of Letters Patent No. 258,475, dated May 23, 1882.

Application filed April 7, 1882. (No model.)

*To all whom it may concern:*

Be it known that I, JEAN RENSON, a subject of the King of Belgium, residing at the city of Duisburg, in the Kingdom of Prussia, German Empire, have invented certain new and useful Improvements in Milk-Boiling Vessels, of which the following is a specification.

The invention has reference to an improved milk-boiling vessel, whereby the boiling over and burning of the milk is entirely prevented; and the invention consists of a culinary vessel provided with a central partition, which extends from the bottom to a point at some distance from the upper part of the vessel, and which is provided with a bottom having a central supporting portion and upwardly-inclined side portions.

In the accompanying drawings, Figures 1 and 2 represent vertical central sections of my improved milk-boiling vessel, and Fig. 3 is a side elevation of the same.

Similar letters of reference indicate corresponding parts.

The milk-boiler consists of a vessel, $a$, which is made of sheet metal, earthenware, or other suitable material, and which is divided by an interior central portion, $b$, into two equal compartments, I and II. The central partition $b$ extends from the bottom to some distance from the upper part of the vessel, preferably to the lower part of the spout $f$, as shown clearly in Figs. 1 and 2. The bottom of the vessel $a$ is provided with a central straight or angular portion, $c$, while the remaining portions, $d$ $d$, at both sides of the central portion $c$ are arranged at an upward inclination to the central portion $c$. By means of this peculiar arrangement of the bottom the vessel may assume three different positions by being supported either on the central portion $c$, as shown in Fig. 1, or upon one or the other of the inclined portions $d$ $d$, as shown in Fig. 2.

In using the milk-boiler one of the compartments I and II is filled with milk. Owing to the weight of the milk, the vessel is tilted over and supported on that portion $d$ of the bottom below the compartment filled with milk. If the milk arrives at the boiling-point, a portion of the same passes over the upper edge of the central partition $b$ into the other compartment, whereby the quantity of milk in compartment I is reduced, and consequently the boiler is returned automatically into its former position of support on the central portion $c$, as shown in Fig. 1, in which position it will then remain. Owing to the small surface of the bottom which is exposed to the heat, the milk is not raised to the boiling-point any more, but is kept warm and ready for use as long as there is fire in the stove.

To secure the proper working of the vessel it may be advisable to fill up the angular space $e$ by means of a suitable weight, whereby the automatical tilting is facilitated. The spout $f$ is so arranged relatively to the central portion, $b$, that the milk can be poured out from both compartments I and II at the same time, though it is obvious that each compartment of the vessel may be provided with a separate spout. Handles $g$ are arranged at both sides of the vessel, or one only may be used at a point diametrically opposite to the spout $f$, as desired. The boiling over and burning of the milk is in this manner obviated in a perfectly automatic manner by a very simple construction of the vessel, and thereby the annoyances and smell arising from burned milk are entirely obviated.

Having thus described my invention, I claim as new and desire to secure by Letters Patent—

A milk-boiler composed of a vessel having a central partition extending from the bottom to some distance from the top, and a bottom provided with a narrow center portion, and with upwardly-inclined portions at both sides of the center portion, substantially as specified.

In testimony whereof I have signed my name to this specification in the presence of two subscribing witnesses.

JEAN RENSON.

Witnesses:
 FERD. MATZKE,
 HERB. KEMMERLING.